United States Patent
Bai

(10) Patent No.: US 7,447,443 B2
(45) Date of Patent: *Nov. 4, 2008

(54) METHOD AND SYSTEM FOR KEEPING TIME ALIGNMENT BETWEEN OPTICAL DATA MODULATION AND A PERIODICALLY MODULATED LIGHT SOURCE

(75) Inventor: Yu Sheng Bai, Los Altos Hills, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 525 days.

This patent is subject to a terminal disclaimer.

(21) Appl. No.: 11/131,517

(22) Filed: May 18, 2005

(65) Prior Publication Data

US 2006/0280507 A1    Dec. 14, 2006

(51) Int. Cl.
*H04B 10/04* (2006.01)

(52) U.S. Cl. .................. 398/183; 398/182; 398/185; 398/186; 398/187; 398/188; 398/189; 398/191; 398/192; 398/193; 398/194; 398/195; 398/196; 398/197; 398/198; 398/154; 398/155; 359/245; 359/237; 359/248; 385/1; 385/2; 385/3; 385/14; 385/31; 372/32; 372/34; 372/36; 372/38

(58) Field of Classification Search .............. 398/183, 398/186, 188, 189, 191, 193, 194, 195, 196, 398/197, 198, 182, 185, 187, 154, 155, 192; 359/245, 237, 248; 385/1, 2, 3, 14, 31; 372/32, 372/34, 36, 38
See application file for complete search history.

(56) References Cited

U.S. PATENT DOCUMENTS

| | | | |
|---|---|---|---|
| 6,728,492 B1 | 4/2004 | Baroncelli | 398/154 |
| 6,763,074 B1 | 7/2004 | Yang | |
| 6,856,770 B2 | 2/2005 | Bai | 398/148 |
| 6,876,818 B1 | 4/2005 | Bai et al. | 398/154 |
| 7,027,735 B2 * | 4/2006 | Kumar | 398/102 |
| 2003/0175037 A1 * | 9/2003 | Kimmitt et al. | 398/198 |
| 2006/0088321 A1 * | 4/2006 | Cheung et al. | 398/195 |
| 2006/0263095 A1 * | 11/2006 | Bai | 398/183 |

FOREIGN PATENT DOCUMENTS

| | | |
|---|---|---|
| CN | 1174634 A | 2/1998 |
| CN | 1304226 A | 7/2001 |
| CN | 1463109 A | 12/2003 |
| JP | 3-274835 A | 5/1991 |
| WO | WO2005/109698 A1 | 11/2005 |
| WO | WO2006/122503 A | 11/2006 |

* cited by examiner

*Primary Examiner*—Hanh Phan
(74) *Attorney, Agent, or Firm*—Townsend and Townsend and Crew LLP

(57) ABSTRACT

A method and system is disclosed for making time alignment for a data transmission system. A first reference clock signal is provided to a first multiplexer coupled to a data modulator through a data driver, and a second reference clock signal is provided to a second multiplexer coupled to a clock modulator through a clock driver. Phase adjustment of the reference clock signal are conducted before the first reference clock signal is provided to the first multiplexer, wherein the phase adjustment aligns a timing of data modulated by the data modulator with a periodically modulated light source generated by the clock modulator.

18 Claims, 5 Drawing Sheets

METHOD AND SYSTEM FOR KEEPING TIME ALIGNMENT BETWEEN OPTICAL DATA MODULATION AND A PERIODICALLY MODULATED LIGHT SOURCE

BACKGROUND

The present invention provides a method that shifts and locks the relative timing between an optical data modulation and a periodically modulated light source.

In optical transmission with data formats other than simple NRZ format, such as a returned to zero (RZ) format, a periodically modulated light source that generates a clocklike pulse stream instead of a continuous wave light source is often used.

To achieve stable and optimized operation, the optical data modulation needs to have a fixed time delay relative to the modulated light source. For example, optimal performance of RZ transmission is usually achieved when the peak of the modulated light overlaps with the center of the data bit slot.

A conventional method to make this time alignment is to shift the timing of the modulated light. This is because it is much easier to make time delay on a clock signal than on a broadband data signal. The timing shift of clock is made available by placing a voltage-controlled phase shifter before or after the clock driver, which is used to drive a clock modulator or a direct modulated laser (DML). The phase shift is thus at the line rate frequency. For example, if the data rate is 10 Gbps, the phase shift is at 10 GHz. In some other conventional RZ pulse generation schemes, half rate frequency can also be used for over-driving a Mach-Zehnder (MZ) modulator to generate line rate clock pulse trains. In this case, the phase shift is at a half rate frequency. In order to prevent the slow drift over time from the optimal point caused by mechanical variation, thermal variation, or other environmental changes in the relative phase, a feedback loop is often implemented to lock the relative timing between the data modulation and the light source.

However, the high frequency phase shifters used in this conventional method are inherently complex and expensive, especially if the phase shift needs to cover a minimum 360 degrees, also known as one bit slot to those skilled in the art. For example, the insertion loss of the phase shifter may vary a lot over the phase shift range. It is also difficult to make phase shifters that have linear phase shift versus control voltage over the large range. Furthermore, when a feedback loop is used to lock the relative timing, the dithering phase shift may add undesirable time jitters to the output optical data signals.

Therefore, it is desirable to devise an improved method for aligning the timing between a clocklike light source and optical data modulation for the generation of RZ-like data signals.

SUMMARY

In view of the foregoing, this invention provides an improved method and system for making time alignment for a data transmission system. More specifically, the phase of a lower frequency clock signal is shifted to align the timing of data modulation with a periodically modulated light source.

In one embodiment, a first reference clock signal is provided to a first multiplexer coupled to a data modulator through a data driver, and a second reference clock signal is provided to a second multiplexer coupled to a clock modulator through a clock driver. Phase adjustment of the reference clock signal are conducted before the first reference clock signal is provided to the first multiplexer, wherein the phase adjustment aligns a timing of data modulated by the data modulator with a periodically modulated light source generated by the clock modulator.

The construction and method of operation of the invention, however, together with additional objects and advantages thereof will be best understood from the following description of specific embodiments when read in connection with the accompanying drawings.

DESCRIPTION

The present disclosure provides a method and system that shift and lock the phase of a lower frequency clock to align the timing of data modulation with the periodically modulated light source.

Figure 1A:
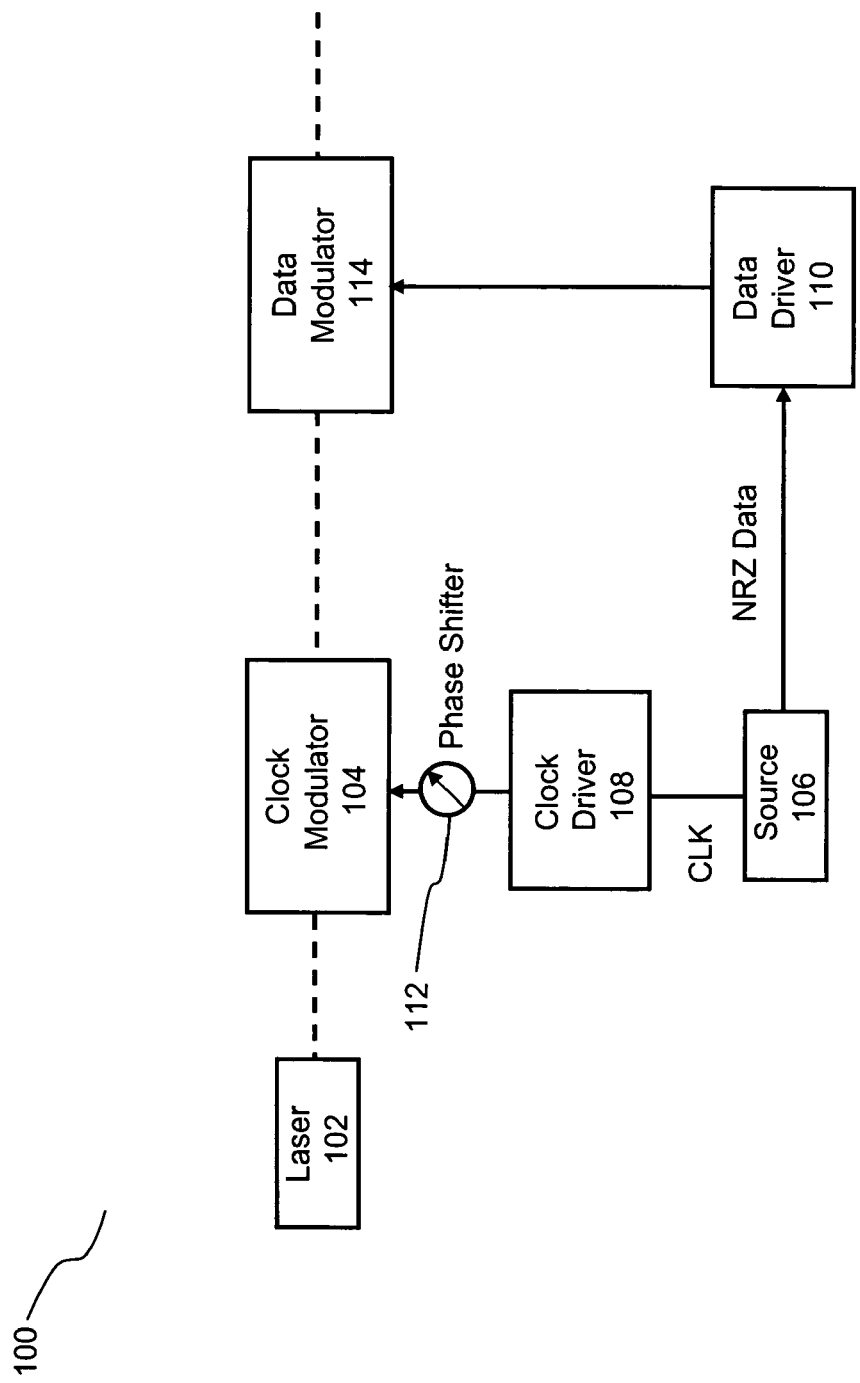
FIG. 1A illustrates a conventional RZ transmitter.

FIG. 1A illustrates a conventional RZ transmitter 100. This transmitter 100 is designed to shift the timing of the modulated light in order to provide the necessary time alignments for stabilizing and optimizing the operation. The alignments with the broadband data signal can be done by making time delay on the clock signal.

The data of a returned-to-zero (RZ) format is generated in two stages as shown in the RZ transmitter 100. In the first stage, a carrier is generated by a continuous wave (CW) laser 102 and a clock modulator 104. A source unit 106 is designed to provide both a clock signal to a clock driver 108, as well as a set of non-returned to zero (NRZ) data to a data driver 110. The timing shift of the clock is done by placing a voltage controlled phase shifter 112 after the clock driver 108. This phase shifted time signal will drive the clock modulator 104. The phase shift is performed at the line rate frequency. For example, if the data rate is 10 Gbps, the phase shift is at 10 GHz. The periodically modulated carrier includes a stream of optical pulses shorter than a bit slot. In the other stage, a physical variable is modulated using a data modulator 114 to encode the data on the optical carrier. The data driver 110 is designed to provide the NRZ data from the source block 106 to the data modulator 114. Together with the encoded data and the periodically modulated carrier, the RZ format can be generated.

It is noted that a half rate frequency may also be used in some RZ pulse generation schemes to over-drive a Mach-Zehnder (MZ) modulator to generate line rate clock pulse trains. In this case, the phase shift is performed at a half rate frequency. However, in all return-to-zero optical transmitters, the degree of misalignment between the data and the clock paths varies with natural effects such as temperature and aging. With increasing bit rates and decreasing bit time slots, the timing variations can severely limit the transmitter performances.

Figure 1B:
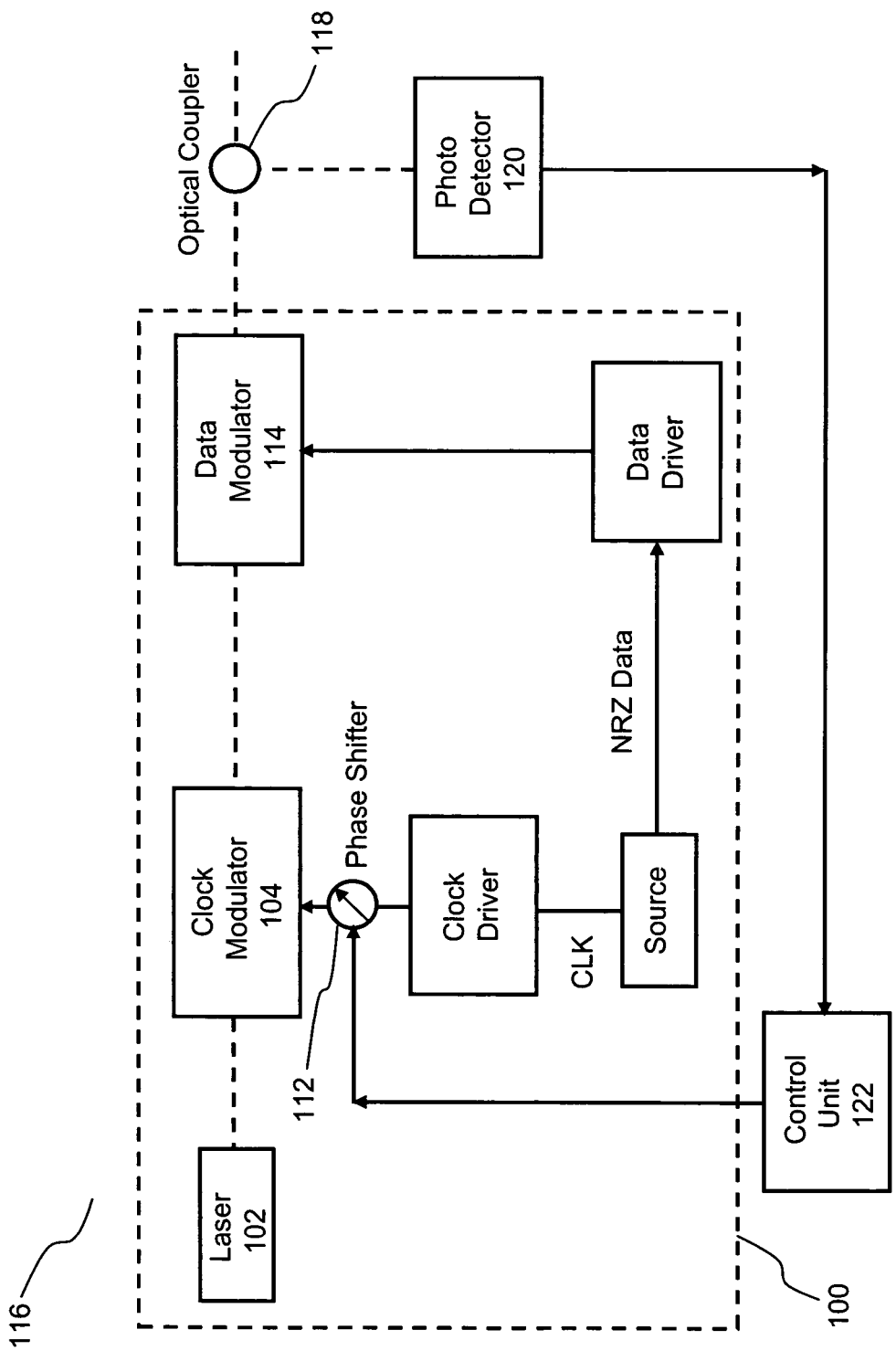
FIG. 1B illustrates a conventional RZ transmitter with a phase lock loop.

FIG. 1B illustrates a conventional RZ transmitter 116, which includes the conventional RZ transmitter 100 and a phase lock loop. The RZ format is generated using an encoded data and a carrier. As mentioned in description of FIG. 1A, the conventional RZ transmitter 100 may have misalignment between the data and the clock paths varied by natural effects such as temperature, environmental changes, mechanical variations, aging, and much more.

To prevent the misalignment from causing relative timing drift from the optimal point, a feedback loop is typically implemented to help lock the relative timing between the data modulation and the light source. This is usually done by first monitoring and analyzing the optical output, and then varying the control voltage to keep the time alignment at an optimal value. This feedback (phase lock) loop includes an optical coupler 118 to monitor the optical output. A photo detector 120 analyzes the optical signal before allowing a control unit 122 to adjust the control voltage at the phase shifter 112.

In general, the average output optical power of an RZ transmitter is at the maximum when the clock peaks are aligned to the center of the bit slots if the "eye" crossing point of the NRZ modulation is lower than 50%, and at the minimum if the "eye" crossing point is higher than 50%. Thus the simplest feedback approach is to monitor the average output optical power, and vary the control voltage on the phase shifter to maximize (or minimize) the output power. To use this approach, the control unit 122 sends a dithering voltage to modulate the control voltage on the voltage controlled phase shifter 112. This dithering voltage can be in the range of tens of hertz to kilohertz. However, the high frequency phase shifter used in conventional RZ transmitters 100 and 116 are inherently complex and expensive, especially if the phase shift needs to cover a minimum 360 degrees or one bit slot. Furthermore, when a feedback loop is used to lock the relative timing, the dithering phase shift may add undesirable time jitters to the output optical data signals.

Figure 2:
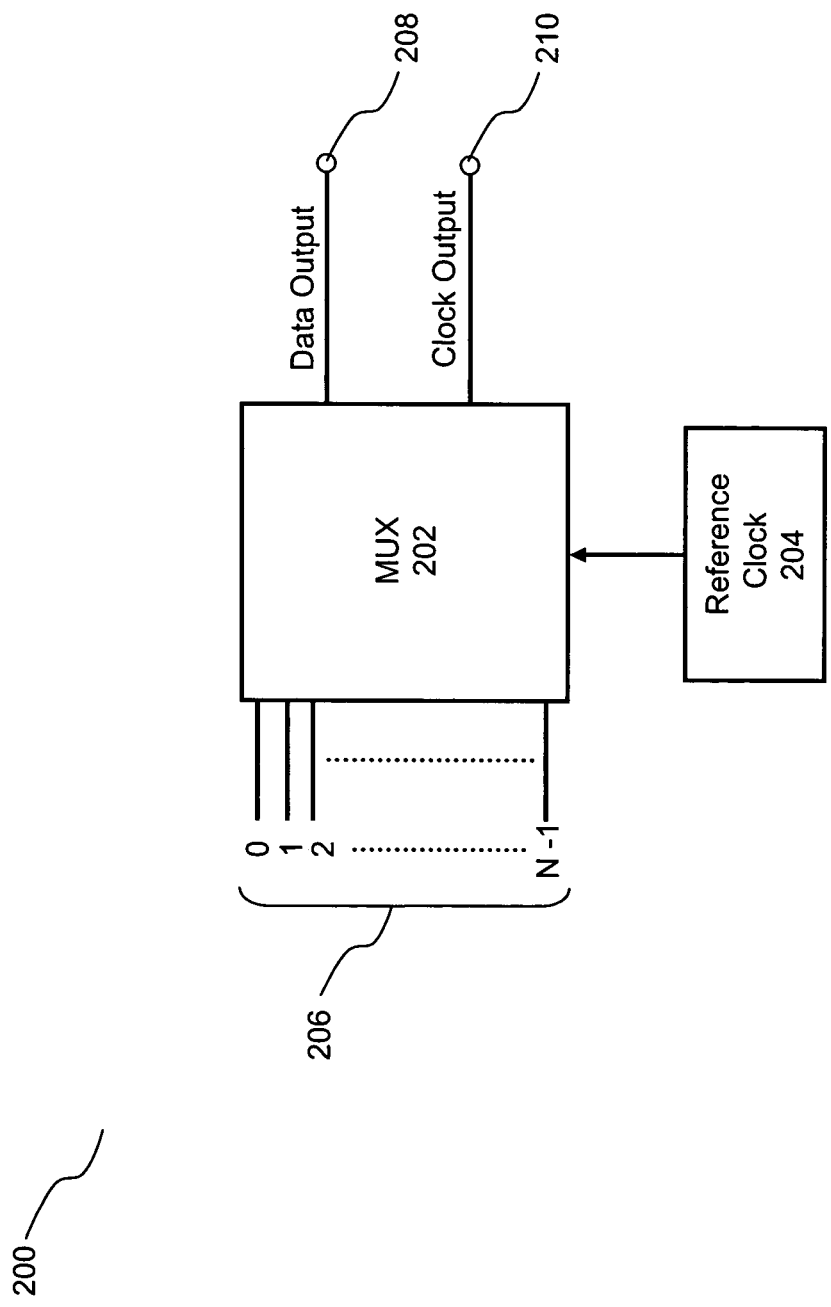
FIG. 2 illustrates an electrical parallel to serial data converter.

FIG. 2 illustrates an electrical parallel-to-serial data converter 200 to be used in various embodiments of the present invention. The electrical parallel to serial data converter 200 comprises a multiplexer (MUX) chip 202 that works with an external reference clock 204. The MUX chip 202 is designed to multiplex lower rate data inputs such as parallel outputs from some DSP chips to form outputs at a relatively high line rate. The parallel outputs of the DSP chips are typically at a data rate many times lower than the line rate. In this embodiment, therefore, the external reference clock 204 is designed to output at fractions of the line rate. Within the MUX chip 202, the clock frequency is up-converted to the line rate frequency, which is used to carry the data output. As shown in the block diagram 200, the MUX chip 202 is designed to receive N number of lower rate data inputs 206. After the up-conversion, the MUX chip 202 can provide a data output 208 and a clock output 210 to the transmitter.

Note that both the line rate clock and the data are designed to be in synchronization with the low frequency reference clock. By shifting the phase of the reference clock, both the clock and the data outputs can be adjusted more effectively. For example, since the frequency of the reference clock is 1/N of the line rate, the phase shift or time shift on the line rate clock is N times larger.

Figure 3A:
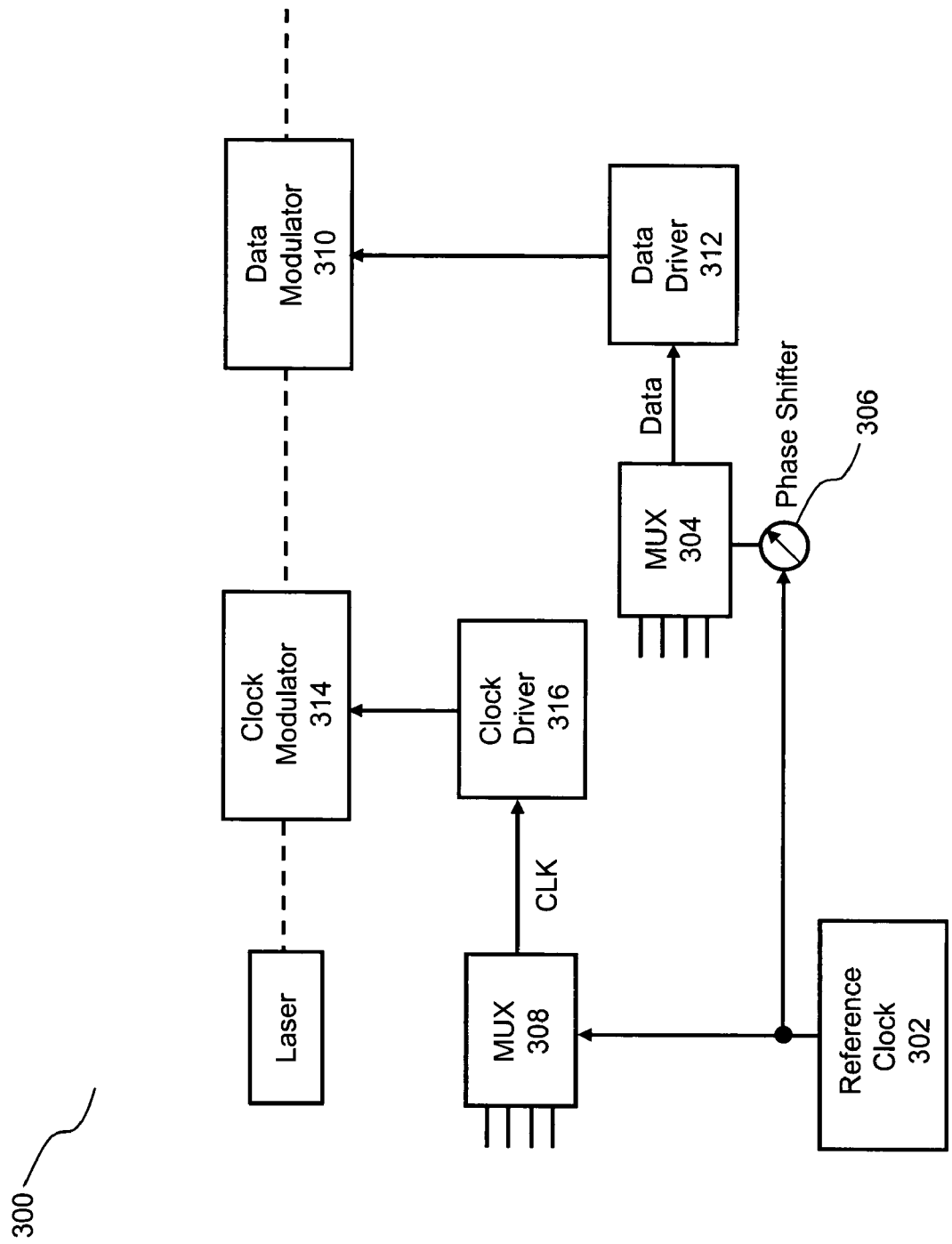
FIG. 3A illustrates an RZ-like transmitter implemented with a low frequency phase shifter in accordance with one embodiment of the present invention.

FIG. 3A illustrates a RZ-like transmitter 300 implemented with a low frequency phase shifter in accordance with one embodiment of the present invention. This method uses a low frequency phase shifter to align the timing between a clock-like light source and optical data modulation for the generation of RZ-like data signals.

In FIG. 3A, a reference clock generator 302 is designed to provide a reference clock signal to both a MUX 304 through a low frequency phase shifter 306 and to a MUX 308. This reference clock signal is at a predetermined frequency lower than the line rate. The MUX 304 is coupled to a data modulator 310 through a data driver 312, while the MUX 308 is coupled to a clock modulator 314 through a clock driver 316. Similar to the conventional RZ transmitter 100, the clock modulator is further connected to a laser source so that a periodically modulated light source can be generated by the clock modulator 314. The MUX 304 functions just like it would in a NRZ transmitter, converting the lower rate parallel data signals to the line rate serial data. The line rate serial clock output of the MUX 304 is used to drive the clock modulator 314.

The parallel inputs of the MUX 308 can be idle, or they may all be connected to ground, as the MUX 308 is designed to provide a line rate clock signal to the clock driver 316 by taking a reference clock input from the reference clock generator 302. The phase shifter 306 is designed to perform a phase adjustment on the reference clock signal before the reference clock signal reaches the MUX 304. By placing a low frequency phase shifter 306 between the reference clock generator 302 and the MUX 304, the phase adjustment of the reference clock signal can be made at a lower frequency to align a timing of data modulator 310 with a periodically modulated light source of the clock modulator 314.

Figure 3B:
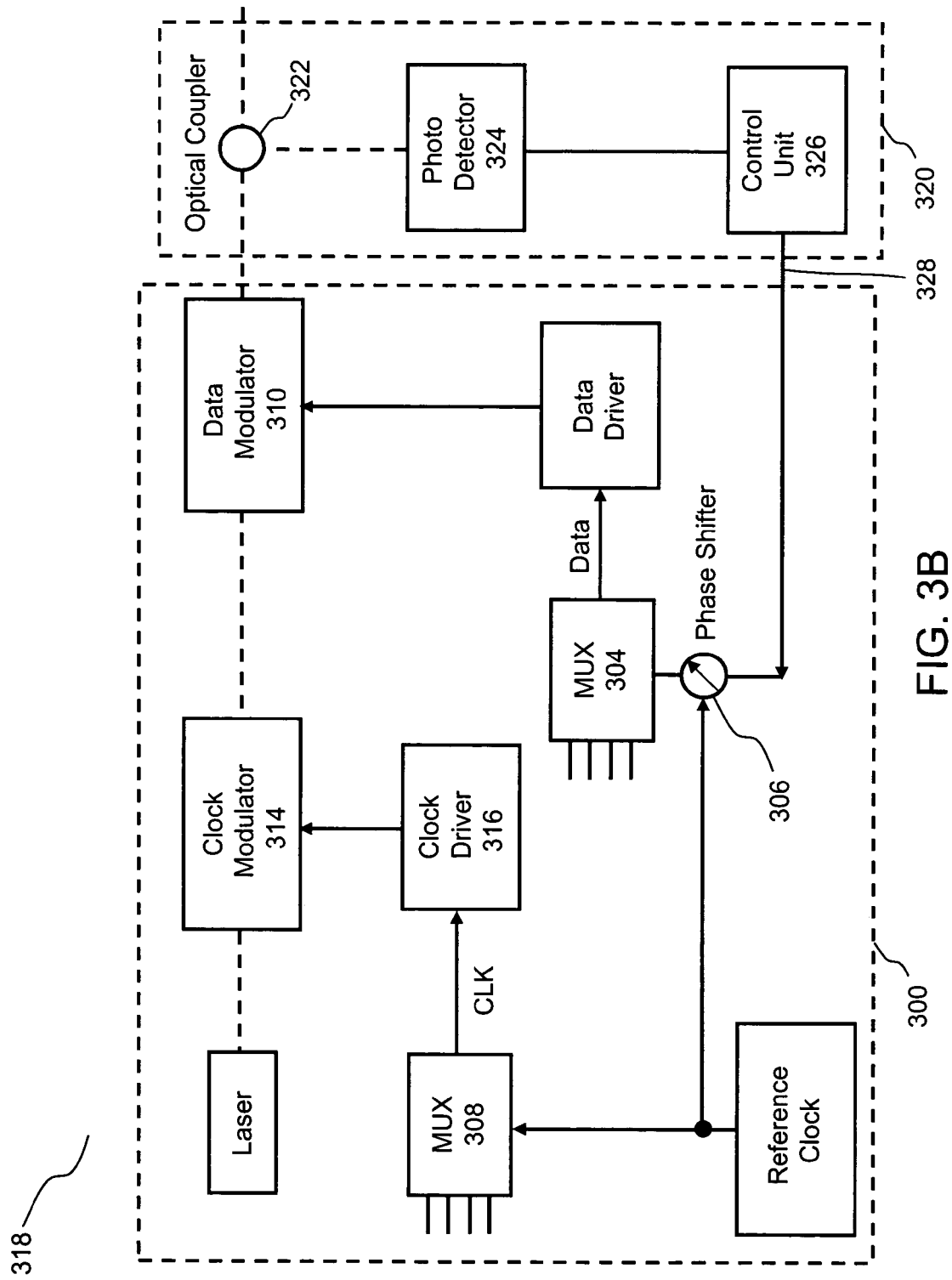
FIG. 3B illustrates an RZ-like transmitter implemented with a low frequency phase shifter and a phase lock loop in accordance with one embodiment of the present invention.

To avoid misalignment and relative timing drift from the optimal point, a feedback loop is implemented to this method in FIG. 3B to help lock the relative timing to the optimal alignment by monitoring the average output optical power and controlling the voltage on the phase shifter accordingly.

FIG. 3B illustrates an RZ-like transmitter 318 implemented with a low frequency phase shifter and a phase lock loop in accordance with one embodiment of the present invention. In this embodiment, the RZ-like transmitter 318 includes both the RZ-like transmitter 300 as described in FIG. 3A and a phase lock loop 320. As described above, misalignment can occur between the data and the clock paths varied by natural effects such as temperature, environmental changes, mechanical variations, aging, and much more. To prevent the misalignment from causing relative timing drift from the optimal point, a feedback loop is typically implemented to help lock the relative timing between the data modulation and the light source. This is usually done by first monitoring and analyzing the optical output, and then by varying the control voltage to keep the time alignment at an optimal value.

The phase lock loop 320, including an optical coupler 322, a photo detector 324, and a control unit 326, is implemented as a feedback loop for locking the relative timing to the optimal alignment. The optical coupler 322 is placed along with the clock modulator 314 and the data modulator 310 to monitor the optical output. The photo detector 324 analyzes the optical signal before allowing a control unit 326 to send a feedback control signal 328 for adjusting the control voltage at the phase shifter 306.

Since the average output optical power of a RZ transmitter is usually at the maximum when the clock peaks are aligned to the center of the bit slots, the simplest feedback approach is to monitor the average power of the optical output, and vary the control voltage on the phase shifter to maximize the output power. To use this approach, the control voltage on the phase shifter is usually dithered (e.g., small modulations in the range of tens of hertz to kilohertz) to generate a necessary feedback signal. In this example, the average power of the optical output is monitored, and the control voltage on the phase shifter 306 may be dithered to generate the necessary feedback signal allowing the control voltage on the phase shifter 306 to be varied to maximize the output power.

As an alternative, the feedback loop can be designed to have the mux 304 to provide an additional line rate clock signal in addition to the data that it sends to the data driver. By comparing this clock signal with the clock signal generated from the clock driver 316, an error signal can be fed back to the control unit 326 for further adjusting the phase shifter 306. For example, the phase difference between these two signals can be indicated by a voltage level derived from the error signal based on two clock signals using an RF mixer (not shown) to combine the signals.

It is also understood that the phase adjustment at the lower rate can be done on the clock side instead of the data side. In another embodiment, the low frequency phase shifter 306 is placed in the clock path before the MUX 308 instead of in the data path before the MUX 304. However, the preferred embodiment is to place the low frequency phase shifter 306 before the MUX 304, since the timing of the clocklike pulse stream will not be affected by the dithering processes, and the time jitter on the RZ output is thus minimized.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method for making time alignment for a data transmission system, the method comprising:
    providing a first reference clock signal to a first multiplexer coupled to a data modulator through a data driver;
    providing a second reference clock signal to a second multiplexer coupled to a clock modulator through a clock driver; and
    phase adjusting the reference clock signal before the first reference clock signal is provided to the first multiplexer;
    providing a feedback control signal for helping phase adjusting the first reference clock signal, wherein the feedback control signal is generated based on a phase difference between a first clock signal from the first multiplexer and a second clock signal from the clock driver coupled to the second multiplexer,
    wherein the phase adjustment aligns a timing of data modulated by the data modulator with a periodically modulated light source generated by the clock modulator.

2. The method of claim 1 wherein the second multiplexer provides a line rate clock signal to the clock driver.

3. The method of claim 2 wherein the first and second reference clock signals are at a predetermined frequency lower than the line rate.

4. The method of claim 1 wherein the feedback control signal is generated in response to a monitored average power of an optical output.

5. The method of claim 1 wherein the phase difference is indicated by a voltage level derived from an error signal combining the first clock signal and the second clock signal.

6. A data transmission system with time alignment, the system comprising:
    a reference clock generating a first reference signal and a second reference signal;
    a first multiplexer receiving the first reference signal;
    a data modulator coupled to the first multiplexer through a data driver;
    a second multiplexer receiving the second reference signal;
    a clock modulator coupled to the second multiplexer through a clock driver;
    a phase shifter coupled between the reference clock and the first multiplexer for making phase adjustment to the first reference signal so that a timing of data modulated by the data modulator is aligned with a periodically modulated light source generated by the clock modulator; and
    a phase lock loop for providing a feedback control signal for helping phase adjusting the first reference signal, wherein the feedback control signal is generated based on a phase difference between a first clock signal from the first multiplexer and a second clock signal from the clock driver coupled to the second multiplexer.

7. The system of claim 6 wherein the second multiplexer provides a line rate clock signal to the clock driver.

8. The system of claim 6 wherein the first and second reference signals are at a predetermined frequency lower than the line rate.

9. The system of claim 6 wherein the feedback control signal is generated for helping phase adjusting the first and second reference signals.

10. The system of claim 9 wherein the feedback control signal is generated in response to a monitored average power of an optical output.

11. The system of claim 9 wherein the feedback control signal is generated based on a phase difference between a first clock signal from the first multiplexer and a second clock signal from the clock driver.

12. The system of claim 11 wherein the phase difference is indicated by a voltage level derived from an error signal generated from the first clock signal and the second clock signal.

13. The system of claim 6 wherein the clock modulator and data modulator implement a return-to-zero modulation mechanism.

14. A data transmission system with time alignment, the system comprising:
    a reference clock generating a first reference signal and a second reference signal at a reference frequency;
    a first multiplexer receiving the first reference signal;
    a data modulator coupled to the first multiplexer through a data driver;
    a second multiplexer receiving the second reference signal;
    a clock modulator coupled to the second multiplexer through a clock driver;
    a phase shifter coupled between the reference clock and the first multiplexer for making phase adjustment to the first reference signal so that a timing of data modulated by the data modulator is aligned with a periodically modulated light source of the clock modulator; and
    a phase lock loop for providing a feedback control signal for helping phase adjusting the first reference signal, wherein the feedback control signal is generated based on a phase difference between a first clock signal from the first multiplexer and a second clock signal from the clock driver coupled to the second multiplexer,
    wherein the data modulator implements a return-to-zero modulation mechanism and the second multiplexer provides a line rate clock signal at a predetermined line rate to the clock driver with the line rate being higher than the reference frequency.

15. The system of claim 14 wherein the feedback control signal is generated for helping phase adjusting the first and second reference signals.

16. The system of claim 15 wherein the feedback control signal is generated in response to a monitored average power of an optical output.

17. The system of claim 15 wherein the feedback control signal is generated based on a phase difference between a first clock signal from the first multiplexer and a second clock signal from the clock driver.

18. The system of claim 17 wherein the phase difference is indicated by a voltage level derived from an error signal combining the first clock signal and the second clock signal.

* * * * *